Figure 1:
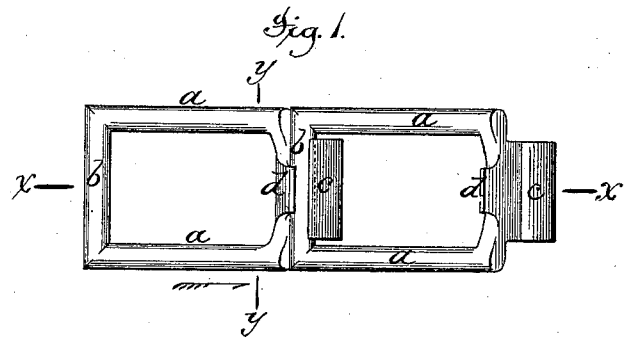

(No Model.)

W. D. EWART.
DRIVE CHAIN.

No. 280,729. Patented July 3, 1883.

Attest;
A. M. Austin.
M. H. Smith

Inventor,
W. D. Ewart
By
J. N. McIntire
Atty.

UNITED STATES PATENT OFFICE.

WILLIAM D. EWART, OF CHICAGO, ILLINOIS, ASSIGNOR TO THE EWART MANUFACTURING COMPANY, OF ILLINOIS.

DRIVE-CHAIN.

SPECIFICATION forming part of Letters Patent No. 280,729, dated July 3, 1883.

Application filed April 27, 1883. (No model.)

*To all whom it may concern:*

Be it known that I, WILLIAM D. EWART, of Chicago, in the county of Cook and State of Illinois, have invented certain new and useful Improvements in Drive-Chains; and I do hereby declare that the following is a full, clear, and exact description thereof, reference being had to the accompanying drawings, making part of this specification.

My invention relates to a new and useful improvement in what are known as "flat drive-chains," which are usually made of a series of duplicate links, which are centrally open, so as to adapt the chain to run on what are commonly known as "sprocket-wheels."

Previous to my invention chains of this type or class have been made in either one or the other of two well-known ways—viz., either so that the links of the chain are inseparable after they have been put together for use by the manufacturer, or so that two adjacent links can be detached or uncoupled from each other when turned out of a working position or into an unusual relative position, while at the same time such detachable parts are not liable to casual separation during the use of the chain.

I propose by my invention to provide for use a drive-chain any two adjacent links of which, although not separable without effecting some change in the condition of the parts of one or the other, may be uncoupled or separated from each other by a very slight bending of a portion of one of the articulated links, either by bending out of its normal shape such portion (by the use of a screw-driver blade or other implement) or by a slight hammering of one or both of the parts to be separated, for the purpose of causing one part to bend that portion of the other part which is to be slightly transformed from its original shape or condition, in order to get the two articulated links separated.

To this main end and object my invention consists in a drive-chain link formed or provided with a C-shaped coupler-hook having an open throat slightly greater in width than the diameter of the plain end bar of the link to be coupled therewith, and having combined with it (near the root of the hook) a short lip-like device adapted to be easily bent over toward the lip or edge of the coupler-hook proper, for the purpose of securing in place within said coupler-hook the plain end bar of a duplicate link, all as will be hereinafter more fully explained; and my invention further consists in the combination, with a link having an open coupler-hook and a keeper-like device, after the fashion just above recited, of projections or stop-like lugs located on the under portions of the side bars, where the latter join the plain end bar, and adapted to prevent any undue lateral movement relatively of any two coupled links, all as will be hereinafter more fully explained.

To enable those skilled in the art to which my invention relates to make and use drive-chains embracing my said invention, I will now proceed to describe the latter more particularly, referring by letters of reference to the accompanying drawings, which make part of this specification, and in which, for the purpose of illustrating my said invention, I have shown coupled together two of my improved links, one of them having the lip-like device above alluded to bent over so as to effect the coupling together of the parts, while the other has said lip-like device left in its original condition, (or as cast in making the links,) ready to be bent to secure the plain end bar of a third link. (Not shown.)

Figure 2:
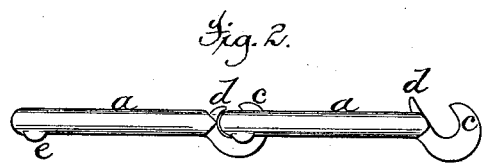
Figure 3:
Figure 4:

Figure 1 is a top or plan view of two links illustrating my improvement. Fig. 2 is a side or edge view of the same. Fig. 3 is a longitudinal section at the line $xx$, Fig. 1; and Fig. 4 is a cross-section at the line $yy$, and looking in the direction indicated by the arrow at Fig. 1.

In the several figures the same part will be found designated by the same letter of reference, and as the links are duplicates, (until a certain portion of one shall have been slightly bent in the operation of putting the links together,) a description of one link will answer for both, the change effected by bending the securing-lip being hereinafter fully explained.

The link is composed, as shown, of two plain side bars, $a\ a$, and a plain end bar, $b$, the other end bar being formed or cast with a C-shaped coupler-hook, c, provided at its root or base with a short lip-like device, d, the link composed of these parts forming a centrally-open or frame-like device, after the fashion of the ordinary sprocket-wheel chain-links most commonly in use.

On that side of the link opposite to where the opening of the C-chaped coupler occurs are two slight projections or lug-like devices, e e, which, as clearly shown, are located at those ends of the side bars which join onto the ends of the plain end bar, b, of the link. The C-shaped coupler-hook is made or cast, as shown, with an open throat about equal to or a little wider than the diameter of the plain end bar, b, which is to be confined in an articulated manner within said coupler-hook, and said coupler-hook is made, as usual, of a length nearly or about equal to the width of the central opening of the link to be coupled thereto, in order to prevent any undue lateral movement relatively of the links when coupled together, all in a manner familiar to those skilled in the art.

From the base or root of the coupler-hook c projects obliquely upward the securing lip-like device d, as clearly shown in the right-hand link of Figs. 1, 2, and 3. This lip-like device d, it will be observed, is very much shorter in the direction of its length than the edge and body portion of the coupler-hook, (which, as before stated, is wide enough to fill up the central opening of the chain-link,) and the stock composing the coupler-hook, lip-like device d, and that end portion of the link where the coupler-hook is located may be depressed or slightly notched, as shown at f f, between the ends of the lip-like device d and the inner portions of the side bars, a a, where the latter join the coupler-hook end portion of the link, for the purpose merely of lightening the link without weakening it.

The link seen at the right-hand side of Figs. 1, 2, and 3 is in the condition in which the links are cast and finished, while the link seen at the left-hand side of said figures is represented as having had its lip-like device d bent over to effect the retention within its coupler-hook of the plain end bar, b, of the other link. It will be understood that in this manner links such as shown are cast in a form which is easily molded without the use of cores (in forming the coupler-hook portion of the link,) while at the same time, by virtue of the small lip-like device d, which may be very easily bent, a series of such links may be permanently coupled together in an articulated manner, and as represented in the drawings, by simply placing the end portion, b, of one link within the coupler-hook of another link and then hammering or otherwise bending over the lip-like device d of the last-named link, in the manner shown in the drawings as to link at the left-hand side of Figs. 1, 2, and 3.

It will be observed that, while the throat or opening of the coupler of the link as originally cast is of a width quite equal to the diameter of the plain end bar of the link to be articulated with said coupler device, a comparatively small throat or slot is left open after the lip-like device d shall have been bent over, as shown and described, and that, therefore, when a series of links shall have been thus articulated or coupled together to make a working-chain, no two of said links can be uncoupled or separated (no matter into what relative position two adjacent links may be turned) without more or less bending out (or rebending toward its original condition) the lip-like device d.

The function and effect of the lug-like projections e are these: Whenever any two coupled links may be turned relatively out of a working position and into such relationship that they would, without any such devices as e, be capable of lateral motion relatively to an extent such that the side bars of one link would come into contact with the ends of the bent lip-like device d, then these stops e e will operate to prevent any such relative lateral movement of the links by coming against the ends of the coupler-hook c. In this manner the serious difficulty of the chain getting kinked up when not in use is entirely avoided, and hence the usefulness of these supplemental devices e e.

It will be understood that in a chain composed of links such as shown, in the manner described, the sizes and proportions of the parts and their relative arrangement may be varied, so long as an uncoupling of any two links may be effected by bending back the lip-like device d (with the end of a screw-driver blade or any other implement which will serve the purpose) until the throat or opening of the coupler-hook c shall have been enlarged to an extent sufficient to permit the free passage through said throat of the end bar of the link coupled therewith.

It will be understood that, in a chain composed of links made according to my present invention, the parts, while they are inseparable after having been properly formed into a chain, may be more easily and conveniently separated than can the parts of non-detachable chains constructed as such chains have been made previous to my invention.

Having now so fully explained the construction and operation of my invention that those skilled in the art can make and use drive-chains embracing the same, what I claim as new, and desire to secure by Letters Patent, is—

1. A chain-link formed or provided at one end with a C-shaped coupler, the open throat of which is equal in width with the diameter of the plain end bar at the opposite end of said link, and also formed or provided with a flexible lip-like device, d, located at the root of the coupler-hook, and adapted to be readily bent over toward the lip of the C-shaped coupler to effect the retention within said coupler of the plain end bar of another link, as set forth.

2. In combination with a link having two plain side bars and one plain end bar, and formed or provided with a coupler-hook, c, and keeper device d, lug-like projections e e, which operate as stops against the ends of the coupler-hook, in substantially the manner and for the purpose hereinbefore described.

In witness whereof I have hereunto set my hand and seal this 23d day of April, 1883.

WILLIAM D. EWART. [L. S.]

In presence of—
GEO. E. MARSHALL,
GLENN B. HOWE.